United States Patent [19]

Metheny et al.

[11] Patent Number: 5,763,969
[45] Date of Patent: Jun. 9, 1998

[54] INTEGRATED ELECTRIC MOTOR AND DRIVE SYSTEM WITH AUXILIARY COOLING MOTOR AND ASYMMETRIC HEAT SINK

[75] Inventors: Larry J. Metheny; Douglas H. Sudhoff; Anthony D. Thompson; Richard J. Budzynski, all of Madison, Ind.

[73] Assignee: Reliance Electric Industrial Company, Cleveland, Ohio

[21] Appl. No.: 749,294

[22] Filed: Nov. 14, 1996

[51] Int. Cl.⁶ .................................................. H02K 11/00
[52] U.S. Cl. ............................. 310/62; 310/63; 310/64; 310/52; 310/53; 310/58; 310/59; 310/89; 310/68; 361/688; 361/690
[58] Field of Search ........................ 310/62, 63, 64, 310/52, 53, 58, 59, 89, 68; 361/688, 690, 695, 696, 697; 165/80.2, 80.3, 121; 257/722

[56] References Cited

U.S. PATENT DOCUMENTS

| | | | |
|---|---|---|---|
| 1,808,845 | 6/1931 | Gifford et al. | 310/62 |
| 3,356,873 | 12/1967 | Tamm | 310/68 |
| 3,592,260 | 7/1971 | Berger | 165/121 |
| 4,518,886 | 5/1985 | Kaneyuki | 310/71 |
| 4,839,547 | 6/1989 | Lordo et al. | 310/60 A |
| 4,840,222 | 6/1989 | Lakin et al. | 165/47 |
| 4,845,394 | 7/1989 | Kleinhans | 310/71 |
| 4,854,373 | 8/1989 | Williams | 165/46 |
| 4,883,982 | 11/1989 | Forbes et al. | 310/62 |
| 4,922,146 | 5/1990 | Vanduyn | 310/59 |
| 5,038,853 | 8/1991 | Callaway, Sr. et al. | 310/62 |
| 5,095,235 | 3/1992 | Kitamura | 310/68 D |
| 5,325,266 | 6/1994 | Lim | 361/704 |
| 5,331,239 | 7/1994 | Kwun et al. | 310/62 |
| 5,563,768 | 10/1996 | Perdue | 361/695 |

Primary Examiner—Thomas M. Dougherty
Assistant Examiner—K. Imayoshi Tamai
Attorney, Agent, or Firm—Michael E. Hudzinski; John M. Miller; John J. Horn

[57] ABSTRACT

An integrated motor drive system includes a variable speed electric motor, a fan connected to the electric motor to generate an air flow as the motor rotates, and a motor drive connected to the electric motor, the drive including a heat sink disposed between the motor and the drive and having a plurality of asymmetrically spaced apart heat transfer fins transferring heat generated by power components in the drive to the air flow. The fan is connected to a one of either the rotor of the variable speed motor or to an auxiliary fan motor controlled independently of the variable speed motor. A fan shroud on one end of the motor acts as an air duct member adapted for dividing and directing the flow of air from the fan to sets of heat transfer fins on the heat sink. A method of operating the drive integrated type motor system includes generating motor speed command signals in the drive based on inputs from an operator through an operator interaface unit on the drive. The interface includes a display area for indicating motor speed in units of % base speed or actual motor RPM.

5 Claims, 6 Drawing Sheets

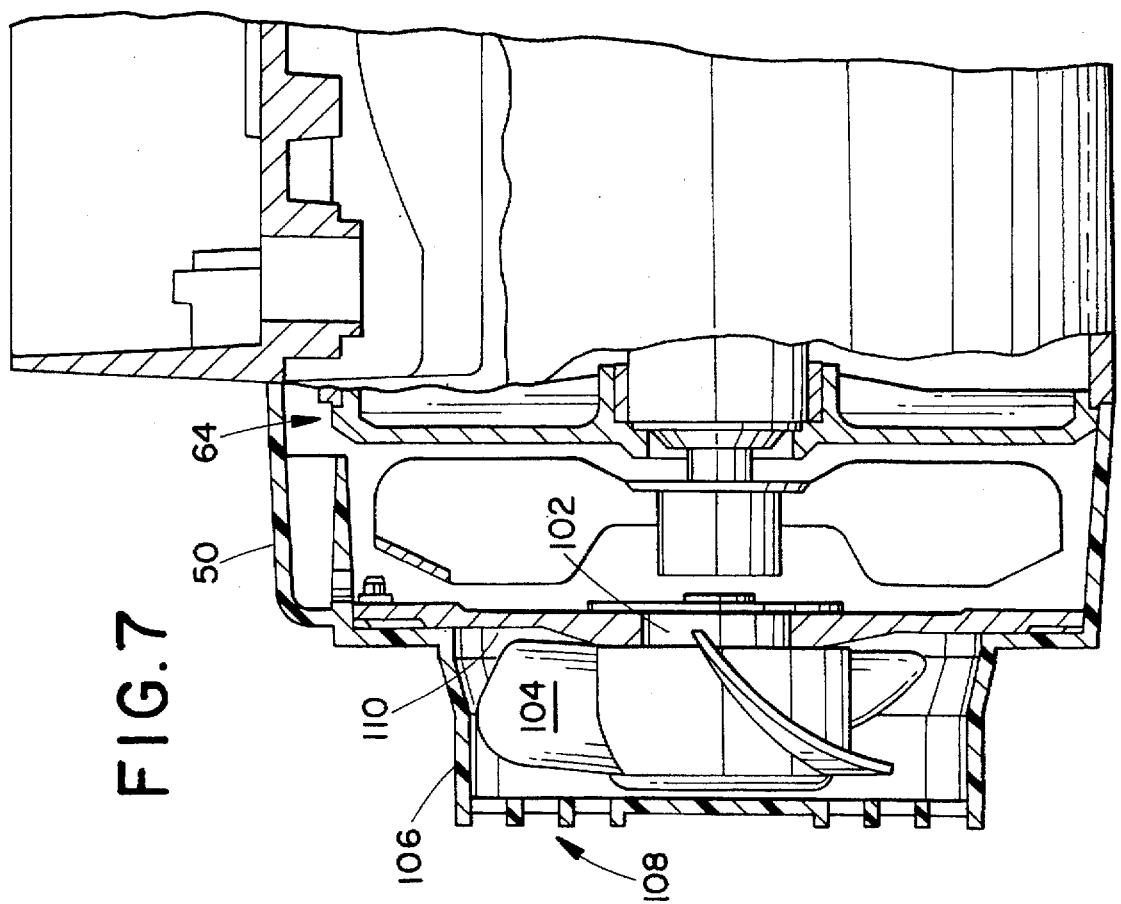

INTEGRATED ELECTRIC MOTOR AND DRIVE SYSTEM WITH AUXILIARY COOLING MOTOR AND ASYMMETRIC HEAT SINK

BACKGROUND OF THE INVENTION

1. Field of the Invention

The present invention pertains to the art of drive integrated type motor systems and, more particularly, to methods and apparatus for providing improved cooling of power electronic devices used in apparatus having one or more drive components integrated into motor.

2. Description of the Related Art

The general notion of integrating a drive into a motor to create a "drive integrated type motor" or alternately, an "integrated motor and drive system" has become very popular over the past several years. One advantage of such systems is their compactness and ease of installation into a larger industrial or other application, due largely to the close proximity of the drive to the motor. Generally, the drive is disposed on the motor or arranged internal of the motor.

U.S. Pat. No. 5,331,239 to Kwun, et al. describes a basic inverter integral type motor wherein an inverter motor drive unit is attached to the outer housing of an electric motor. The motor described includes a laminated stator structure encasing a rotor having a fan on a first end and a keyed output shaft on the other, or second end. A plurality of apertures are stamped into each of the stator laminations to collectively form a set of longitudinal passageways axially extending from the first end of the motor through the stator to the second end thereof. The fan is housed in and covered by a shroud adapted to engage the first end of the motor. The passageways are formed in the "corners" of the rectangular stator structure to minimize negative magnetic loss while providing for ventilation, and thus cooling, of the motor itself as the fan turns with the motor.

The inverter motor drive in the Kwun, et al. system includes a base forming a large finned heat sink which is connected directly to the laminated stator structure. In an attempt to cool electronic components within the drive, a portion of the air flow generated by the fan on the rotor is diverted from use in cooling the motor laminations. The diverted portion is directed at the finned heat sink on the motor.

Although the above configuration may provide adequate cooling results over a limited operating range, one drawback in the design is that only a portion of the air flow generated by the fan is directed at the heat sink fins to cool the electric drive components. In certain operating situations, it may be necessary to direct the entire air flow at the heat sink in order to adequately cool the electronic power components comprising the inverter drive. In that operating mode, the cooling of the motor is compromised.

Another disadvantage of standard integrated motor/drive systems of the type described by Kwun, et al. is that the standard large finned heat sinks typically used are adapted to provide a cooling effect that is substantially uniform over its surface area. This is due to the even, or regular, distribution of the heat transfer fins on the face of the heat sink. This design limitation largely ignores the reality in motor drives that certain power and other electronic components generate large amounts of heat while other devices may generate only small amounts. Thus, traditional heat sinks used in integrated motor/drive systems of the type described by Kwun, et al. require that either the power components be evenly distributed over the heat sink surface with regard to their power generating capabilities, or that a large enough heat sink is used to compensate for "hot spots" created by the physical arrangement of power components to provide for adequate cooling of the largest expected localized areas of heat generation.

An additional drawback to the prior art integrated motor/drive systems such as taught by Kwun, et al. is the inherent mismatch, at certain motor speed ranges, between the production of heat in the drive, and thus the need for cooling, and the ability of the fan to generate an adequate flow of air over the heat sink as may be necessary to dissipate the generated heat. More particularly, as a general rule, the power components within the motor drive generate a greater amount of heat as the speed of the motor is decreased. However, since the fan in the prior art drive integrated type motor systems is typically mounted directly to the rotor shaft, as the speed of the motor is decreased, the amount of air flow generated by the fan is correspondingly decreased. Thus, it may not be possible to sustain motor operations at low speeds for extended periods of time.

SUMMARY OF THE INVENTION

Accordingly, it is an object of the present invention to provide an improved motor/drive system which overcomes the above discussed problems found in the prior art and which is capable of operation over a wide range of motor speeds for extended periods of time, including low speeds, without drive component failure such as may be caused by overheating.

It is another object of the present invention to provide an improved heat sink apparatus for use in an integrated drive and motor system, the heat sink including a plurality of asymmetrically spaced apart cooling fins on a first surface thereof.

It is still another object of the present invention to provide an improved fan and a fan shroud arrangement for use in an integrated drive and motor system, the fan being a bi-directional fan for operation in both clockwise and counterclockwise rotor rotation and the shroud being adapted to direct substantially all of the air flow generated by the bi-directional fan at the heat sink.

It is yet a further object of the present invention to provide an auxiliary source of air flow directed at the heat sink of an integrated drive and motor system for improved cooling of the drive components at lower motor rotational speeds. The speed of an auxiliary fan is either fixed at a speed to generate an air flow providing optimized cooling over a range of motor speeds or, preferably, the fan motor speed is variably controlled over the range to be inversely related to the speed of the fan on the motor.

It is still yet further another object of the present invention to provide a simple and convenient method of operating a variable speed electric motor with an integrated drive through interface software in the drive and a user friendly operator's panel on the drive.

To these ends, according to the present invention, there is provided an improved drive integrated type motor system including an electric motor, a fan connected to the electric motor for generating an air flow, and a motor drive mounted to the electric motor. The motor drive in the novel system includes a heat sink having a plurality of asymmetrically spaced apart heat transfer fins transferring the heat generated by the motor drive to the air flow. The plurality of heat transfer fins are arranged on the heat sink based on an expected heat generating capability of the electronic components disposed on the heat sink. The size and/or numbers of fins are larger in the area of potentially high heat generation or in areas proximate large power devices or clusters of power devices.

The present invention further provides an improved fan shroud for use in the drive integrated type motor system. The fan shroud is adapted to direct substantially all of the air flow generated by the fan at the drive heat sink. The improved fan shroud is particularly adapted to cooperate with a bi-directional fan to divide the generated air flow into a plurality of component air flows, preferably a pair of component air flows, each having different volume air flow rates. The air flow having the higher volume air flow rate is directed at an area of the heat sink likely to experience a larger heat buildup due to the arrangement and/or type of power electronic components placed thereon. The air flow having the lower air flow concentration is directed at an area of the heat sink likely to experience a smaller heat buildup due to the aforementioned arrangement and/or type of power electronic components placed thereon.

Still further, the present invention provides a second fan for generating a second air flow directed at the heat sink. The second fan is powered by an auxiliary electric motor adapted to generate the second air flow independent of any mechanical connection to the motor.

Yet still further, the present invention provides a simple and convenient method of operating a variable speed electric motor with an integrated drive through a convenient operator's panel located on the drive. The method includes generating a first motor speed command in the drive to rotate the rotor at a first rotational speed and simultaneously displaying the programmed first rotational speed on the operator's panel in units of motor revolutions per minute or as a percentage of base speed. Further, upon receiving a speed change signal into the drive from the operator's panel, a second motor speed signal is generated based on the speed change signal to rotate the rotor at a second rotational speed. The second programmed rotational speed is then correspondingly displayed on the operator's panel in units of motor revolutions per minute or as a percentage of base speed.

BRIEF DESCRIPTION OF THE DRAWINGS

The invention may take physical form in certain parts and arrangements of parts, the preferred embodiments of which will be disclosed in detail in this specification and illustrated in the accompanying drawings which form a part hereof and wherein:

FIG. 7 is a partial cross sectional view of an alternative embodiment of the fan and shroud cooling elements of the present invention;

FIG. 8 is a graph showing a pair of air flow rates plotted against motor rotational speed according to an air flow control aspect of the present invention; and, FIG. 9 is a flow chart showing a preferred method of operating the drive integrated type motor system according to the present invention.

DETAILED DESCRIPTION OF THE PREFERRED EMBODIMENTS

Figure 1:
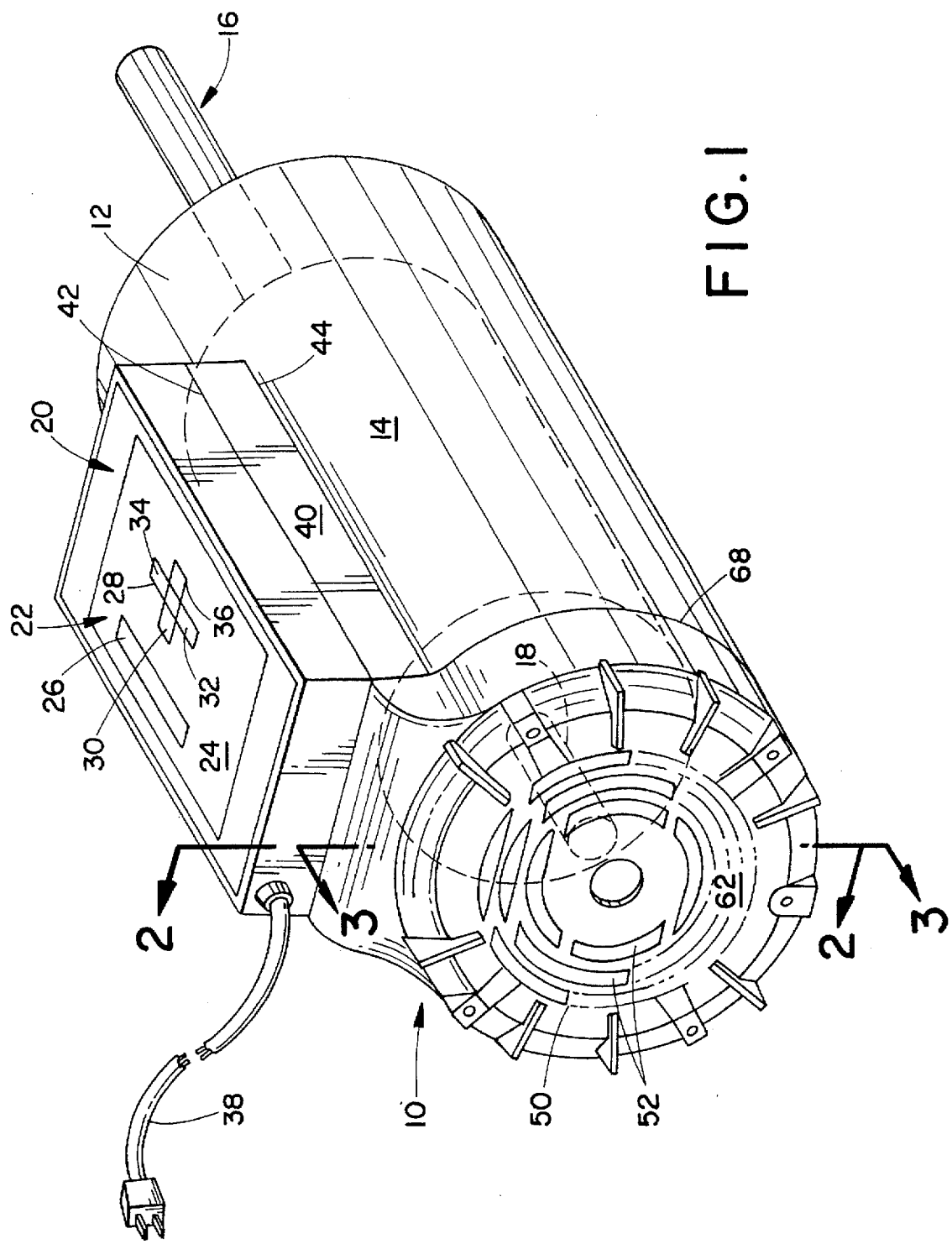
FIG. 1 is a perspective view of the integrated motor and drive system according to a preferred embodiment of the present invention.

With reference now to the drawings wherein showings are for purposes of illustrating the preferred embodiments of the invention only and not for the purposes of limiting same, FIGS. 1–7 illustrate a first preferred embodiment of the improved drive integrated type motor system of the present invention being generally identified by the reference numeral 10. With particular reference first to FIG. 1, the system includes an electric variable speed motor 12 with a rotor 14 connected to a shaft having an output end 16 and a fan drive end 18.

An electric variable speed motor drive 20 is disposed on the motor 12 as shown in the FIGURES. An operator interface 22 is provided on the top surface 24 of the drive 20 and includes a display area 26 for displaying a numerical or graphical representation of an operating condition of the motor, preferably the rotating speed of the output shaft in revolutions per minute (RPMs), or, alternatively, the rotating speed of the output shaft represented in percentage of motor base speed. The operator interface 22 also preferably includes a keypad 28 having a set of input switches 30–36 for use by an operator of the drive integrated type motor system 10. The keypad 28 includes a "Start" key 30, a "+SPEED" key 32, a "–speed" key 34 and a "Stop/Reset" key 36, the functionality of which will be described in greater detail below. The drive is adapted for connection to a source of AC power using a power cord 38.

Figure 6:
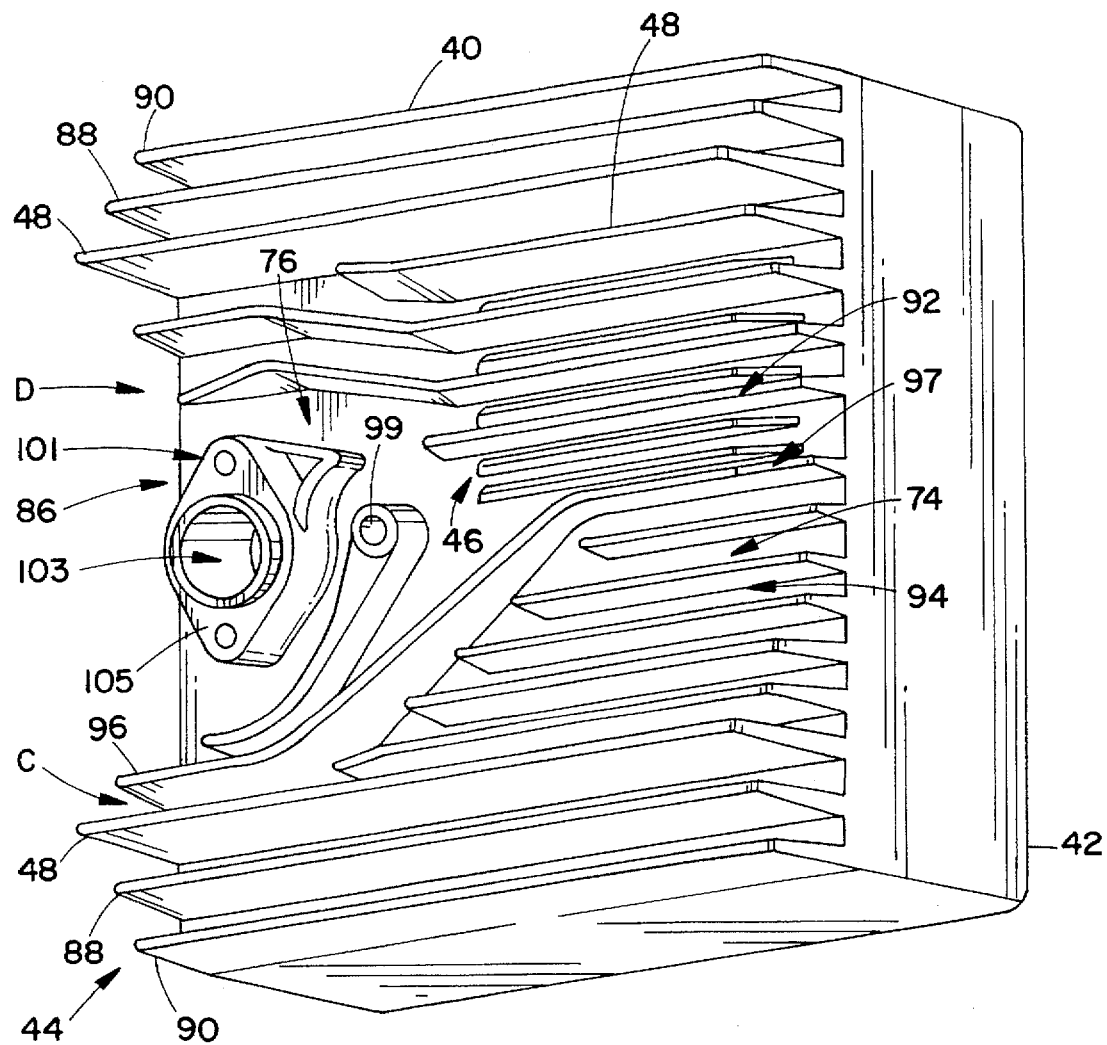
FIG. 6 is a perspective view of the preferred embodiment of the heat sink used in the integrated motor and drive system according to the invention.

Interposed between the variable speed motor 12 and the variable speed motor drive 20 is a heat sink apparatus 40 according to one aspect of the present invention. The heat sink apparatus 40 includes a top side 42 for mounting a plurality of power and other electronic devices comprising the drive 20 thereon, and a bottom side 44 including a plurality of asymmetrically arranged finned cooling members 46. The heat sink apparatus is best shown in FIG. 6 but generally includes a pair of longitudinally extending cooling fins 48 adapted to engage the outer surface of the casing of the motor 12 in a manner shown. The drive 20 is fastened to the motor 12 using conventional fasteners, preferably nuts and bolts, glue, or the like.

A fan shroud 50 according to another aspect of the present invention is adapted to engage both an end of the motor 12 and an end of the heat sink apparatus as best shown in FIG. 1.

A bi-directional fan 60 (FIG. 2) is connected to the fan drive end 18 of the rotor for generating an air flow as the rotor rotates within the motor. The fan shroud 50 includes a plurality of input apertures 52 providing a source of input air for travel into the shroud 50, past the fan, and through the heat sink apparatus 40. In this first preferred embodiment according to the present invention, all of the air flow generated by the bi-directional fan is directed at the finned cooling members of the heat sink apparatus 40.

Figure 2:
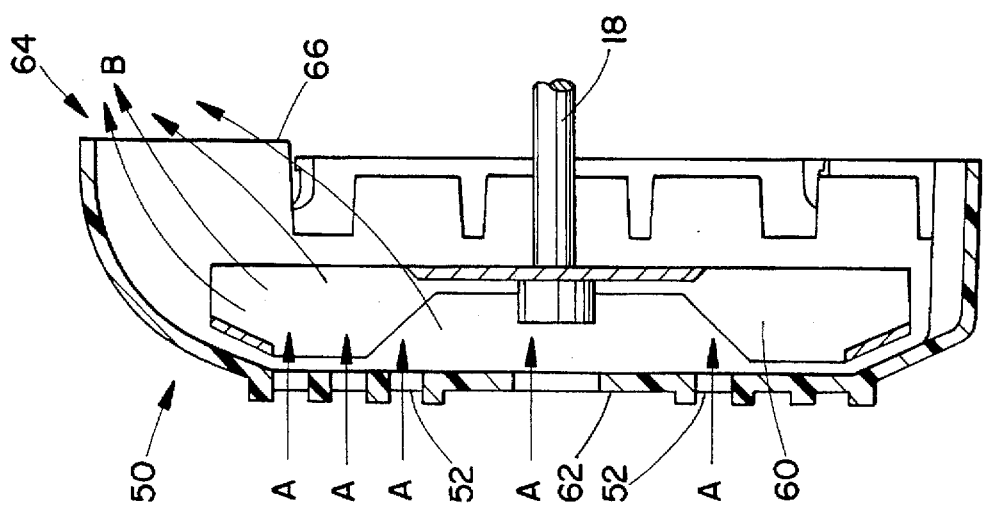
FIG. 2 is a cross sectional view of the fan shroud illustrated in FIG. 1 taken along line 2—2.
Figure 3:
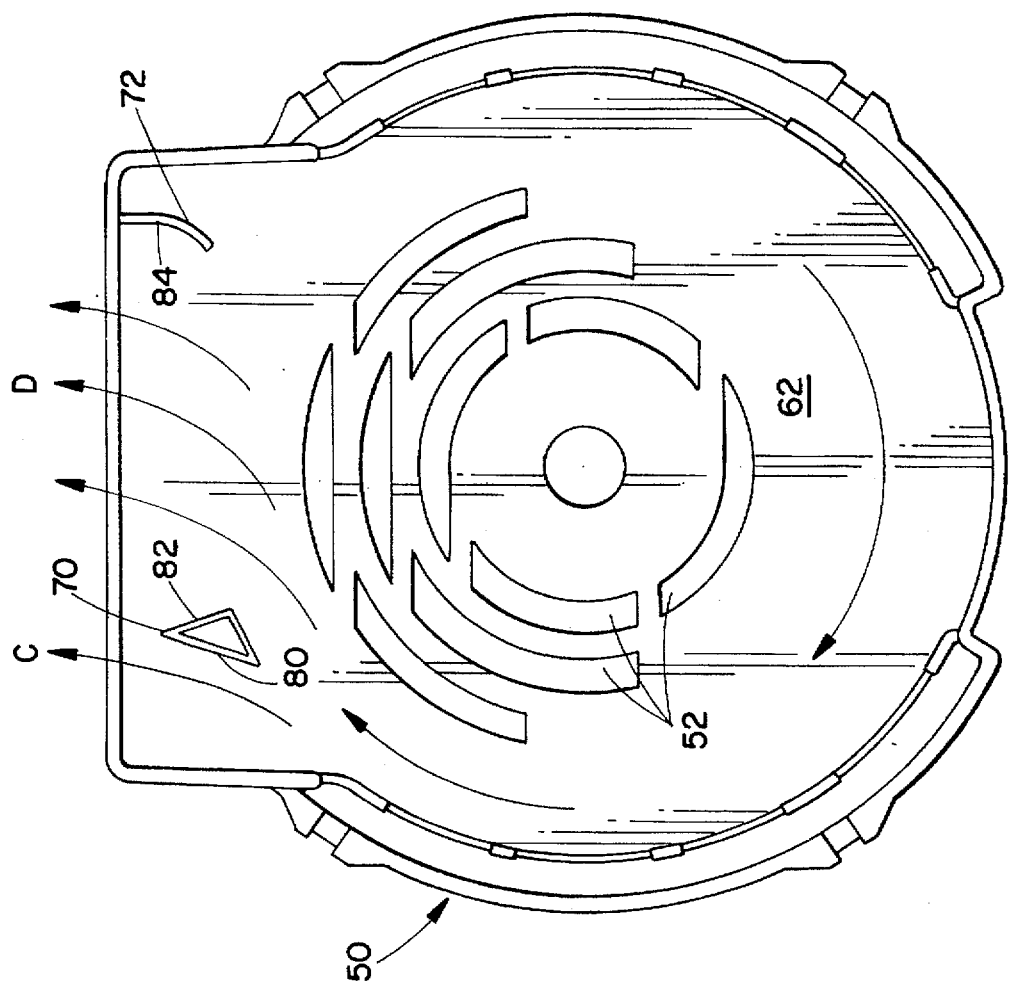
FIG. 3 is a plan view of the fan shroud illustrated in FIG. 1 taken along line 3—3 illustrating the air flow paths for clockwise rotation of the motor fan.
Figure 4:
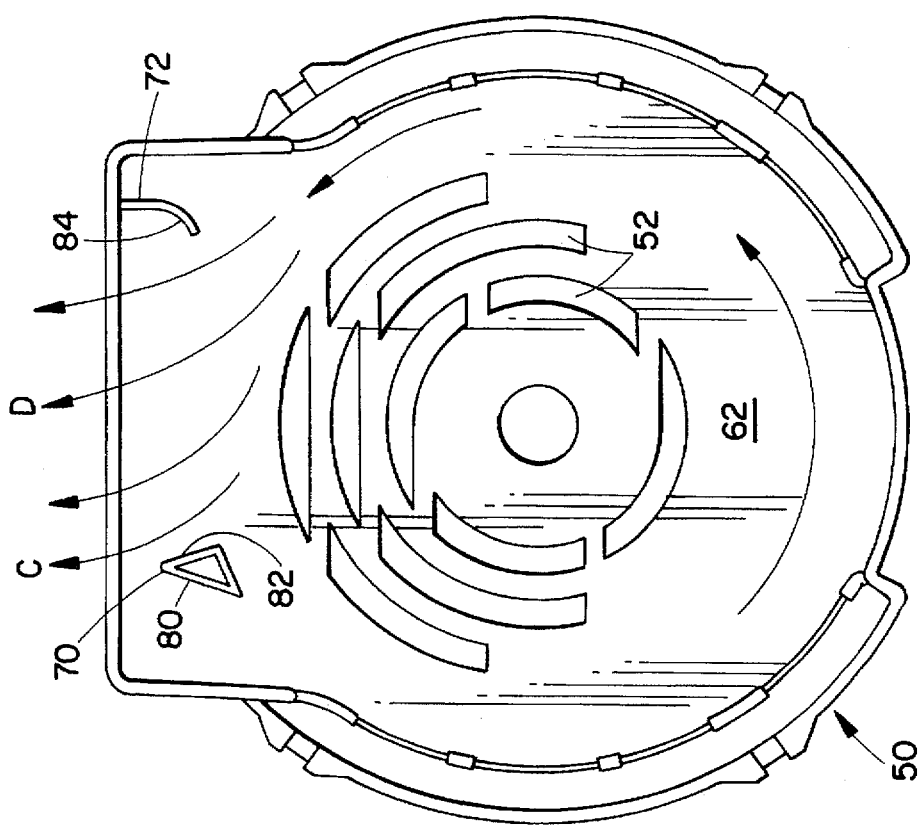
FIG. 4 is a plan view of the fan shroud as illustrated in FIG. 3 illustrating the air flow paths for counterclockwise rotation of the motor fan.

FIGS. 2–4 respectively show the preferred fan shroud 50 in partial cut away and in elevational views for illustrating the flow of air for clockwise (FIG. 3) and counterclockwise (FIG. 4) rotation of the bi-directional fan 60. With reference first to FIG. 2, the fan shroud 60 generally includes a face plate member 62 provided with said plurality of input apertures 52 for permitting inlet air generally designated by the reference letter A to enter into the cavity formed within the shroud. The inlet air A is drawn into the shroud by the rotation of the bi-directional fan 60 connected to the fan drive end 18 of the rotor 14. The air flow is directed at the finned cooling members 46 of the heat sink apparatus 40 through a single exhaust aperture 64 as exhaust air generally designated in FIG. 2 by the reference letter B. It is an advantage of the present invention that substantially all of the inlet air A converted to exhaust air B is directed through the finned cooling members 46 of the heat sink apparatus 40 to cool electronic components mounted to the top side 42 thereof. In the preferred embodiment illustrated, the exhaust aperture is formed by the interface between the open end 66 of the shroud and the back face 68 of the motor 12.

Figure 5:
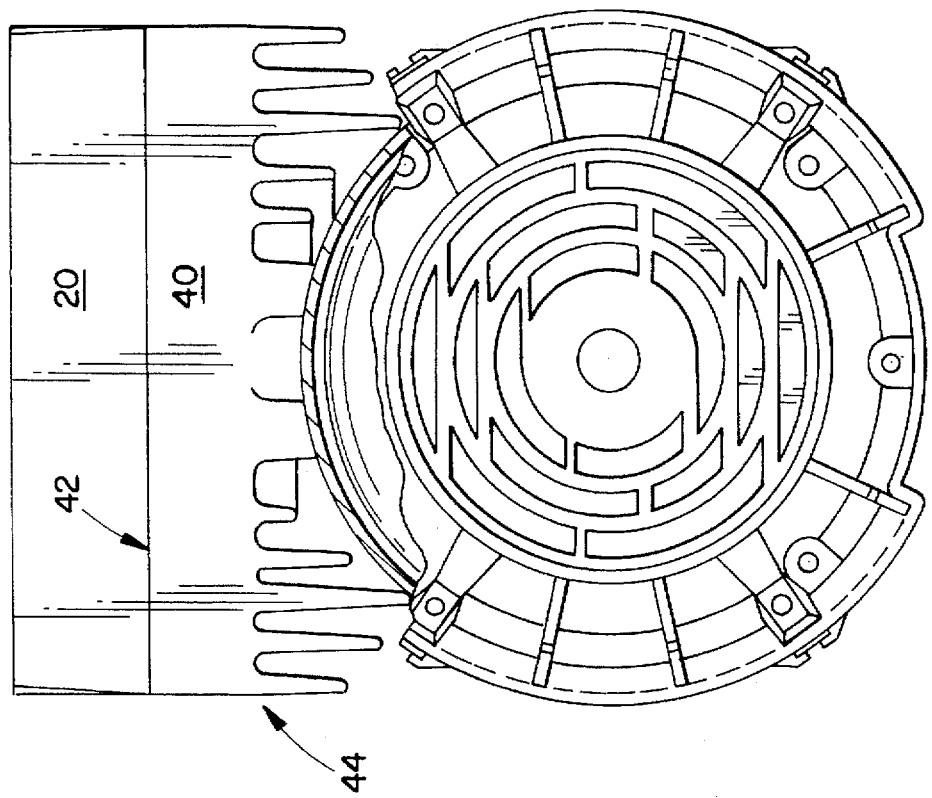
FIG. 5 is an end view of the motor, drive, and heat sink apparatus of the integrated motor and drive system of FIG. 1 in partial cross section.

FIGS. 3 and 4 are elevational views of the fan shroud according to an aspect of the present invention illustrating the air flows created for a clockwise rotation and a counterclockwise rotation, respectively, of the bi-directional fan 60. In general, the exhaust air B is divided into a plurality of component air flows, preferably a pair of air flows including a first component air flow C and a second component air flow D. The air flow is divided by a pair of cooperating first and second air baffles 70, 72 disposed on the face plate member 62 of the fan shroud 60. Each of the pair of component air flows are directed "into" the page as viewed in FIGS. 3 and 4. Accordingly, as best shown in FIGS. 5 and 6, the first component air flow C is directed at a first portion 74 of the heat sink while the second component air flow D is directed at a second portion 76 of the heat sink. Preferably, each of the component air flows has a unique volume air flow rate that is selected to provide adequate cooling for the power components or other heat generating elements on the respective first and second portions of the heat sink.

In the preferred embodiment illustrated in FIGS. 3 and 4, the first baffle 70 is triangular in cross section and includes a planar first face member 80 and a planar second face number 82. The second baffle 72 is generally arcuate in cross section and includes a concave first surface 84. For the clockwise fan rotation illustrated in FIG. 3, the concave first surface 84 of the second baffle 72 creates a positive pressure zone urging the second component air flow D into the second portion 76 of the heat sink. The planar first face member 80 of the first baffle 70 similarly creates a positive pressure zone while the planar second face 82 of the first baffle 70 downstream of the clockwise fan rotation creates a negative pressure zone, the combination of which urging the first component air flow C into the portion 74 of the heat sink and the second component air flow D into the second portion of the heat sink.

For the counterclockwise rotation illustrated in FIG. 4, the concave first surface 84 of the second baffle 72 creates a negative pressure zone causing the second component air flow D to change direction abruptly and enter into the second portion 76 of the heat sink. The planar second face member 82 of the first baffle 70 creates a positive pressure zone while the first face member 80 creates a negative pressure zone, the combination of which urging the first component air flow C into the first portion 74 of the heat sink.

FIG. 6 best shows the preferred heat sink 40 according to an aspect of the present invention. The heat sink includes a plurality of finned cooling members 46 asymmetrically disposed on the bottom side 44 of the heat sink in a central region 86. The central region 86 of the heat sink is the region between the pair of cooling fins 48. The pair of cooling fins 48 are adapted to engage the motor housing when the drive 20 is connected to the motor and heat sink as a single unit to thereby create a passageway for containing the flow of the component air flows C, D over the central region 86 of the heat sink. In the preferred embodiment illustrated, the heat sink includes a first and second set of cooling fins 88, 90 disposed on the outside of the passageway created by the pair of fins 48.

More particularly, the first and second set of cooling fins 88, 90 provide for enhanced cooling of the heat sink by radiating heat from the drive components to ambient air directly without significantly affecting the thermal balance between the heat sink and the component air flows C, D within the passageway between the pair of mounting fins 48.

With continued reference to FIG. 6, the central region 86 of the heat sink preferably includes a first region 92 having a higher concentration of cooling fins or a higher amount of effective cooling surface area, and thus a higher cooling capacity. A second region 94 has a lower concentration of cooling fins, or alternatively, a lower amount of effective cooling surface area, and therefore has a lower cooling capacity. Further, the preferred cooling fin arrangement includes a serpentine cooling fin 96 adapted to concentrate the second component air flow D into flowing over the first region 92 of the heat sink 40. The height of the serpentine cooling fin 96 illustrated is varied along its length making the fin adapted to nearly engage the motor casing along its length contacting the casing only along a small portion 97 of the fin 96, thus effectively dividing the air flows over the heat sink into two discreet flows each having different volume air flow rates while minimizing the area of contact between the heat sink and the motor casing.

It is an advantage of the present invention that the amount of heat permitted to flow from the case of the motor 12 to the heat sink is minimized. In the preferred embodiment illustrated, the heat sink directly contacts the case of the motor at only four (4) points. More particularly, a pair of linear mechanical interfaces are established by each of the fins 48 described above. A single end 97 of the serpentine cooling fin 96 contacts the motor casing on a first end of the heat sink while an annular boss 99 contacts the motor casing on a second end of the heat sink. The annular boss 99 provides access through the heat sink to pass a bolt or the like for attaching the heat sink and drive to the motor. Except as noted above, all of the other cooling fins shown are held in close proximity to the motor to trap and direct air flow, but without contacting the motor casing to avoid absorbing heat from the motor into the heat sink.

An elongated oval lead outlet boss 101 defines a lead wire passageway 103 through the heat sink. The lead wire passageway 103 provides a connection path for lead wires connecting the drive on one side of the heat sink with the motor coils in the motor casing on the other side of the heat sink. The lead outlet boss 101 also defines a smooth surface 105 adapted to engage a gasket (not shown) preferably disposed between the heat sink and the motor housing. The gasket seals the lead wire passageway 103 and also insulates the heat sink from the motor frame for preventing heat migration into the heat sink from the motor.

With reference now to FIG. 7, another aspect of the present invention is shown including an auxiliary blower unit including a variable speed D.C. motor 102, auxiliary fan 104 connected to the motor, and an auxiliary fan shroud 106 adapted to engage the fan shroud 50 described above.

Although the instant preferred embodiment illustrated includes a variable speed D.C. motor, alternative schemes are possible such as, for example, a simple single phase fixed speed A.C. or D.C. motor. In that alternative, according to the invention, a speed is selected to generate an air flow providing optimized cooling effect over the entire range of operating speeds of the motor.

With continued reference to FIG. 7, the shroud 106 has an inlet side 108 for permitting air to be drawn into the shroud and an open outlet side 110 adapted to interface with the motor fan shroud 50. Air drawn into the auxiliary shroud 106 by the auxiliary fan 104 powered by the D.C. motor 102 is directed into the motor fan shroud 50 and then toward the exhaust aperture 64 in a manner shown.

Although not illustrated in the FIGURE, the DC motor 102 is connected to the drive 20 using suitable lead wires. The speed of the motor and in turn the fan 104 is controlled by the drive 20 in a manner best illustrated in FIG. 8. Generally, the amount of air flow generated by a fan is related to its speed of rotation. Accordingly, the flow of air generated by the motor fan 60 generally follows the curve labeled 121. As the speed of the motor increases the amount of air flow is increased. Conversely, as the speed of the motor decreases, the amount of air flow dramatically decreases. In order to compensate for the increased demand in the drive for cooling at low motor speeds, according to an aspect of the invention, the speed of the D.C. motor 102 connected to the fan 104 is controlled to generate an air flow that generally follows the curve labeled 123. More particularly, as the speed of the motor 12 decreases, the speed of the DC motor 102 is increased. Preferably, the drive 20 controls both motors so that the speeds thereof are inversely related. However, other control schemes are possible to ensure adequate cooling of the heat sink for a wide range of motor speeds. As an example, the D.C. motor may be controlled to operate at full speed whenever the speed of the motor 12 is below a threshold set point speed. Further, as indicated above, the auxiliary motor may be a single phase fixed speed A.C. motor, the speed being selected to generate an air flow providing optimized cooling over the range of anticipated motor speed and heat generation within the drive 20.

Figure 9:
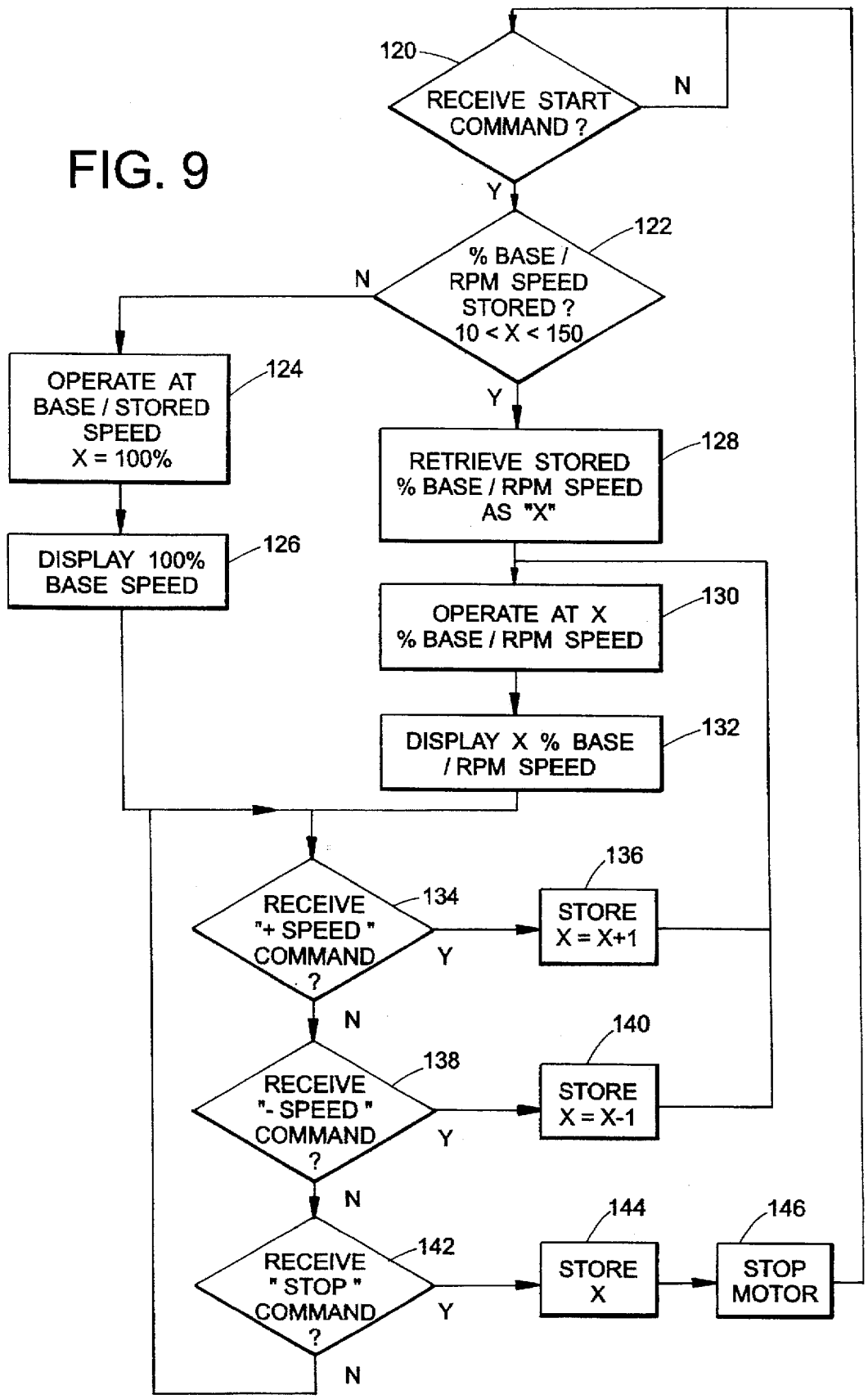

A preferred method of operating the integrated motor apparatus shown above will now be described with reference to FIGS. 9 and 1. Assuming the motor to be initially at rest, a "Start" command is received 120 into the drive 20 when an operator depresses the "Start" key 30 on the keypad 28 located on the operator interface of the drive. In response to receiving the "Start" command, the drive interrogates a buffer memory location within the drive (not shown) for a stored % speed value 122. For the motor of the preferred embodiment, the % speed range is from 10% to 150% of base speed. Alternatively, actual motor speed in revolutions per minute (RPM) may be used. In the event that there is no previous % speed value available, such as at system initialization or during first startup, the drive generates motor control signals to cause the motor to operate at base speed 124. The drive displays 126 the commanded motor speed control value on the display area 20 of the operator interface 22.

In the event that a previous % speed value is available, that value "X" is retrieved 128 from the buffer location. The drive then generates the suitable motor control signals to cause the motor to operate at the retrieved speed X 130. The drive displays 132 the commanded motor speed control value X on the display area 26 of the operator interface 22.

While the motor is operating at a speed X determined by the commanded motor control signals, the drive monitors the "+Speed" key 32, the "−Speed" key 34, and the "STOP/RESET" key 36 on the operator interface 22. When the operator depresses the "+Speed" key 32 on the interface 22, a "+Speed" command signal is received 134 into the drive 20 whereupon a new value for the previous speed X is stored as X=X+1 in step 136. The drive 20 then generates a new commanded motor speed control signal in step 130 and displays the new speed on the operator interface display area 26 in step 132.

When the generator depresses the "−Speed" key 34 on the interface 22, a "−Speed" command signal is received 138 into the drive 20 whereupon a new value for the previous speed X is stored as X=X−1 in step 140. The drive thus generates a new commanded motor speed control signal in step 130 and displays the new speed on the operator interface display area 26 in step 132.

Lastly, when the operator depresses the "STOP/RESET" key 36 on the interface 22, a "STOP/RESET" command signal is received 142 into the drive 20 whereupon the present value of the motor speed X is stored in a buffer memory within the drive in Step 144. The drive then generates a new commanded motor speed control signal in step 146 to stop the motor 14.

While the particular preferred embodiments of the present invention have been shown and described in detail above, it should be clear that changes and modifications may be made to such embodiments without departing from the true scope and spirit of the invention. It is intended that the appended claims cover all such changes and modifications.

Having thus described the preferred embodiments of the invention, we now claim:

1. A drive integrated type motor system comprising:
   a substantially cylindrical electric motor including a rotor,
   a fan connected to said rotor of the electric motor and generating an air flow;
   a motor drive;
   a heat sink having a first side adapted to mount to said motor drive and a second side including a first pair of cooling fins adapted to engage an outer surface of said substantially cylindrical electric motor and a plurality of asymmetrically spaced apart heat transfer fins disposed on said second side of the heat sink between said first pair of cooling fins for transferring heat generated by said motor drive to said air flow;
   a fan shroud connected to one end of the motor to direct all of said air flow from said fan toward said plurality of asymmetrically spaced apart heat transfer fins, the fan shroud including a first baffle for dividing said air flow from said fan into a plurality of component air flows, a first component air flow among said plurality of component air flows being directed toward a first group of said asymmetrically spaced apart heat transfer fins and a second component air flows among said plurality of component air flows being directed toward a second group of said asymmetrically spaced apart heat transfer fins.

2. The drive integrated type motor system according to claim 1 wherein said fan shroud and said baffle are adapted to divide said air flow from said fan into a plurality of component air flows each having a respective air flow rate, said first component air flow among said plurality of component air flows having a first air flow rate and being directed toward a first group of said asymmetrically spaced apart heat transfer fins arranged in a first concentration distribution on said motor drive and said second component air flow among said plurality of component air flows having a second air flow rate greater than said first air flow rate and being directed toward a second group of said asymmetrically spaced apart heat transfer fins arranged in a second concentration distribution on said motor drive higher than said first concentration distribution.

3. The drive integrated type motor system according to claim 2 wherein said fan is a bi-directional fan; and, said fan shroud and baffle are adapted to divide said air flow into said plurality of component air flows for a clockwise rotation direction of said bi-directional fan and for a counterclockwise rotation direction of said bi-directional fan.

4. The drive integrated type motor system according to claim 1 further comprising a second fan connected to a fan motor independent of said electric motor, the fan motor being connected to said fan shroud.

5. The drive integrated type motor system according to claim 1 wherein:

said first pair of cooling fins extend perpendicularly from the second side of the heat sink by a first distance; and, said plurality of asymmetrically spaced apart heat transfer fins each respectively extend perpendicularly from the second side of the heat sink by a distance less than said first distance.

\* \* \* \* \*